US012565577B2

(12) United States Patent
Gander et al.

(10) Patent No.: US 12,565,577 B2
(45) Date of Patent: Mar. 3, 2026

(54) RUBBER COMPOSITION CONTAINING A DIENE ELASTOMER HAVING CARBONATE FUNCTIONAL GROUPS

(71) Applicant: COMPAGNIE GENERALE DES ETABLISSEMENTS MICHELIN, Clermont-Ferrand (FR)

(72) Inventors: Sophie Gander, Clermont-Ferrand (FR); Adeline Jasselin, Clermont-Ferrand (FR); Benoit Schnell, Grenchen (CH); Francois Jean-Baptiste-Dit-Dominique, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 449 days.

(21) Appl. No.: 17/767,848

(22) PCT Filed: Oct. 8, 2020

(86) PCT No.: PCT/FR2020/051774
§ 371 (c)(1),
(2) Date: Apr. 8, 2022

(87) PCT Pub. No.: WO2021/069841
PCT Pub. Date: Apr. 15, 2021

(65) Prior Publication Data
US 2025/0277105 A1 Sep. 4, 2025

(30) Foreign Application Priority Data
Oct. 10, 2019 (FR) ...................................... 1911277

(51) Int. Cl.
*C08K 3/36* (2006.01)
*C08L 9/06* (2006.01)

(52) U.S. Cl.
CPC .................................... *C08L 9/06* (2013.01); *C08K 3/36* (2013.01); *C08L 2312/04* (2013.01)

(58) Field of Classification Search
CPC .......... C08K 3/36; C08L 9/06; C08L 2312/04
USPC .......................................................... 524/856
See application file for complete search history.

(56) References Cited

U.S. PATENT DOCUMENTS 7,250,463 B2 7/2007 Durel et al.
7,820,771 B2 10/2010 Lapra et al.
8,461,269 B2 6/2013 Varagniat et al.
8,637,606 B2 1/2014 Pille-Wolf et al.
8,883,929 B2 11/2014 Gandon-Pain et al.
10,920,046 B2 2/2021 Jean-Baptiste-Dit-Dominique et al.
11,241,370 B2 2/2022 Valero et al.
2005/0004297 A1 1/2005 Durel et al.
2005/0032965 A1 2/2005 Valero
2008/0132644 A1 6/2008 Lapra et al.
2009/0270558 A1 10/2009 Gandon-Pain et al.
2010/0022714 A1 1/2010 Varagniat et al.
2010/0221541 A1 9/2010 Valero et al.
2010/0317800 A1* 12/2010 Pille-Wolf ............... C08K 5/47 525/149
2011/0021702 A1 1/2011 Gandon-Pain et al.
2011/0263784 A1 10/2011 Valero et al.
2012/0208948 A1 8/2012 Gandon-Pain et al.
2015/0197591 A1 7/2015 Pierre et al.
2015/0299435 A1 10/2015 Fleury et al.
2015/0322234 A1 11/2015 Fleury et al.
2015/0337109 A1 11/2015 Fleury et al.
2015/0368444 A1 12/2015 Fleury et al.
2019/0276648 A1* 9/2019 Jean-Baptiste-Dit-Dominique ..... C08K 5/18

FOREIGN PATENT DOCUMENTS

FR 3053974 A1 1/2018
JP 2005-120231 A 5/2005
JP 2016-180049 A 10/2016
WO 97/36724 A2 10/1997
WO 99/16600 A1 4/1999
WO 03/016215 A1 2/2003
WO 03/016387 A1 2/2003
WO 2006/069792 A1 7/2006
WO 2006/069793 A1 7/2006
WO 2008/003434 A1 1/2008
WO 2008/003435 A1 1/2008
WO 2010/144890 A2 12/2010
WO 2013/182814 A1 12/2013
WO 2014/095582 A1 6/2014
WO 2014/095583 A1 6/2014
WO 2014/095585 A1 6/2014
WO 2014/095586 A1 6/2014

OTHER PUBLICATIONS

International Search Report dated Nov. 26, 2020, in corresponding PCT/FR2020/051774 (4 pages).
S. Brunauer, et al., "Adsorption of Gases in Multimolecular Layers", J. Am. Chem. Soc., vol. 60, pp. 309-318 (1938).

* cited by examiner

*Primary Examiner* — Kelechi C Egwim
(74) *Attorney, Agent, or Firm* — VENABLE LLP

(57) ABSTRACT

A rubber composition contains at least: a reinforcing filler comprising silica, an elastomer comprising units of a 1,3-diene monomer and bearing carbonate functions that are each present in a 1,3-dioxolan-2-one ring, a crosslinking system comprising a polyamine compound, and a terpene phenolic resin.

14 Claims, No Drawings

RUBBER COMPOSITION CONTAINING A DIENE ELASTOMER HAVING CARBONATE FUNCTIONAL GROUPS

TECHNICAL FIELD

The field of the present invention is that of diene rubber compositions, in particular diene rubber compositions comprising a crosslinking system other than a vulcanization system.

PRIOR ART

Ideally, a rubber composition intended to be used in a tire must meet a large number of technical requirements. One of these is the cohesion of the rubber composition. Good cohesion of a rubber composition is generally expressed by a good level of reinforcement of the rubber composition. Other technical requirements concern the properties at break, in particular at high strains, which can reflect the endurance properties of the tire for example and thus affect the service life.

The reinforcement of a rubber composition may be improved by introducing, into the rubber composition, reinforcing fillers, optional coupling agents intended to couple the rubber and the reinforcing filler, or else functional elastomers. Among the functional elastomers known to improve the reinforcement of a rubber composition, mention may be made of elastomers bearing, for example, silanol, alkoxysilane or carboxylic acid functions. The applicant described in document FR 3053974 a rubber composition containing a functional diene elastomer bearing carbonate functions each present in a 1,3-dioxolan-2-one ring with the aim of improving the reinforcement of the composition comprising silica as reinforcing filler. The elastomeric matrix of this composition is vulcanized with sulfur.

Compositions based on a conventional sulfur-based vulcanization system are often complex since they comprise, in addition to sulfur, or a sulfur-donating agent, vulcanization accelerators, activators, and optionally vulcanization retarders.

With a view to simplifying the compositions and the preparation thereof, the applicant has in the past proposed rubber compositions comprising diene elastomers bearing epoxy functions that serve as anchor points for the crosslinking by means of crosslinking systems that are as effective as conventional vulcanization systems. Thus, for example, the documents WO2014095582, WO2014095583, WO2014095585 and WO2014095586 describe such tire rubber compositions comprising polycarboxylic acids combined with imidazole compounds as crosslinking systems.

Furthermore, it is known that resins bearing carbonate or thiocarbonate functions can be crosslinked by polyamine-type crosslinking agents as described for example in documents JP2016180049 and JP2005120231 and WO 2013182814A1.

It is still necessary to improve the properties of the rubber compositions which are used in the manufacture of tires in order to improve the performance of the latter. However, the compositions that make up the tire must generally satisfy a compromise of sometimes contradictory properties. For example, when the tensile properties are improved, that is to say when the strain and tensile strength increase, this is often accompanied by a reduction in the stiffness, in particular at medium strains. Thus it is an ongoing objective of the designers of rubber compositions to ensure that the improvement of certain properties does not come at the expense of others, The objective set by the inventors is to have rubber compositions which can be used for tire manufacture, which are simple to prepare and which have good tensile properties while maintaining a good level of reinforcement and stiffness.

STATEMENT OF THE INVENTION

The inventors have discovered that the use, in a rubber composition, of a diene elastomer bearing carbonate functions that are each present in 1,3-dioxolan-2-one rings and also a polyamine-based crosslinking system, in the presence of a terpene phenolic resin, have good tensile properties while maintaining a good level of reinforcement and stiffness.

SUMMARY OF THE INVENTION

Thus, a first subject of the invention is a rubber composition containing at least:

a reinforcing filler comprising silica, an elastomer comprising units of a 1,3-diene monomer and bearing carbonate functions that are each present in a 1,3-dioxolan-2-one ring, a crosslinking system comprising a polyamine compound, and a terpene phenolic resin, Preferably, the composition according to the invention comprises an elastomer comprising units of a 1,3-diene monomer and bearing carbonate functions that are each present in a 1,3-dioxolan-2-one ring, which carbonate functions are pendent and located outside the ends of the elastomer chain.

Preferably, the composition according to the invention comprises an elastomer comprising units of a 1,3-diene monomer and bearing carbonate functions that are each present in a 1,3-dioxolan-2-one ring, of which the content of carbonate functions is between 0.1 and 20 mol per 100 mol of monomer units constituting the elastomer.

Preferably, the composition according to the invention comprises an elastomer comprising units of a 1,3-diene monomer and bearing carbonate functions that are each present in a 1,3-dioxolan-2-one ring, the 1,3-diene monomer of which is 1,3-butadiene, isoprene or the mixture thereof, preferably 1,3-butadiene.

Preferably, the composition according to the invention comprises an elastomer comprising units of a 1,3-diene monomer and bearing carbonate functions that are each present in a 1,3-dioxolan-2-one ring, and also units of a vinylaromatic monomer, preferably styrene.

Preferably, the polyamine compound of the crosslinking system of the composition according to the invention is a polyamine compound comprises at least two amine functions, preferably two amine functions, bonded together by covalent bonds or by aliphatic or aromatic hydrocarbon groups or partially aliphatic and aromatic hydrocarbon groups, optionally comprising one or more heteroatoms and the amine functions of which are primary or secondary, preferably primary, amine functions.

Preferably, the hydrocarbon group bonding two amine functions of the polyamine compound is an oligomer having a number-average molecular mass Mn of at most 1500 g/mol, more preferentially of at most 1000 g/mol.

Preferably, the composition according to the invention comprises a polyamine compound at a content ranging from 0.2 to 20 phr.

Preferably, the composition according to the invention comprises a polyamine compound corresponding to the general formula (VI):

RRN-A-NRR in which:

A represents a covalent bond or a hydrocarbon group comprising at least 1 carbon atom, which is optionally substituted and optionally interrupted by one or more heteroatoms, the R symbols represent, independently of one another, a hydrogen atom or an alkyl group comprising at least 1 carbon atom.

Preferably, the composition according to the invention comprises a reinforcing filler comprising more than 50% by weight of silica relative to the total weight of the filler.

Preferably, the composition according to the invention comprises a terpene phenolic resin predominantly consisting of units derived from terpene and phenol monomers.

Preferably, the composition according to the invention comprises a terpene phenolic resin present at a content of at least 0.5 phr and of at most 50 phr.

The invention also relates to a tire which comprises the rubber composition in accordance with the invention.

DETAILED DESCRIPTION

In the present description, unless expressly indicated otherwise, all the percentages (%) given are % by weight. The abbreviation “phr” means parts by weight per hundred parts of elastomer (of the total of the elastomers if several elastomers are present).

Furthermore, any interval of values denoted by the expression “between a and b” represents the range of values greater than “a” and less than “b” (that is to say, limits a and b excluded), whereas any interval of values denoted by the expression “from a to b” means the range of values extending from “a” up to “b” (that is to say, including the strict limits a and b).

The compounds mentioned in the description can be of fossil origin or be biobased. In the latter case, they may be partially or completely derived from biomass or be obtained from renewable starting materials derived from biomass. Polymers, plasticizers, fillers and the like are concerned in particular.

In the present application, “carbonate function” is intended to mean the group of formula —O(C═O)O—. The carbonate function of use for the purposes of the invention is found in a cyclic structure since it is in the form of the 1,3-dioxolan-2-one ring.

In the present application, “1,3-diene monomer unit” is intended to mean a unit which results from the insertion of a 1,3-diene monomer into a growing polymer chain. As is known, units of a 1,3-diene monomer may result from a 1,2- or 1,4-insertion of the 1,3-diene monomer into the polymer chain. In the case of a 1,4-insertion, they may be in the cis or trans configuration.

In the present application, the word “(meth)acrylate” indiscriminately denotes acrylate and methacrylate.

In the present description, the expression “pendent” relating to the carbonate function is used in the same sense as the term “pendent” used in the definition of “pendent group” given by IUPAC, PAC, 1996, 68, 2287.

I. Rubber Composition of the Invention

I.1. Diene Elastomer Bearing Carbonate Functions that are Each Present in a 1,3-Dioxolan-2-One Ring The elastomer of use for the purposes of the invention comprises units of a 1,3-diene monomer. As 1,3-diene monomer, mention may be made of those having 4 to 8 carbon atoms, such as, for example, 1,3-butadiene, 2,3-dimethyl-1,3-butadiene, isoprene or piperylene. The halogenated derivatives thereof, such as, for example, chloroprene, are also suitable, The 1,3-diene monomer may also consist of a mixture of these monomers, in which the 1,3-diene monomer units are made up of the monomer units of each of the monomers composing the mixture. Preferably, the 1,3-diene is 1,3-butadiene, isoprene or the mixture thereof. More preferentially, the 1,3-diene is 1,3-butadiene.

The elastomer of use for the purposes of the invention bears carbonate functions which are each present in a 1,3-dioxolan-2-one ring.

Preferably, the carbonate functions are pendent. More preferably, the carbonate functions are pendent and located outside the ends of the elastomer chain. In particular, the pendent position of the carbonate functions makes the carbonate functions more accessible to the chemical functions of the polyamine crosslinking agent, which promotes the crosslinking of the elastomer chains and therefore the stiffness of the material.

According to one embodiment of the invention, the carbonate functions may be introduced by chemical modification of a polymer. They may for example be grafted along an elastomer comprising 1,3-diene monomer units. Thus, the carbonate functions may be present in compounds that are at least substituted by a group containing a 1,3-dioxolan-2-one ring and a function that is reactive with the elastomer. It is possible to envisage various types of chemistry known to those skilled in the art for the grafting of functions onto diene elastomers, optionally bearing functions that are reactive with the grafting compound. By way of example, mention may be made of grafting via a compound comprising a group containing a 1,3-dioxolan-2-one ring and a function capable of forming a [1,3] dipolar addition to an unsaturated carbon-carbon bond, for example a nitrile oxide, a nitrone, a nitrile imine.

According to another embodiment of the invention, the carbonate functions may be introduced by copolymerization with at least one diene monomer forming the 1,3-diene monomer units. Thus, the carbonate functions may be present in monomer units of a vinyl monomer that is at least substituted by a group containing a 1,3-dioxolan-2-one ring.

The vinyl monomer is preferentially a vinyl monomer containing the 2-oxo-1,3-dioxolan-4-yl group of formula (1).

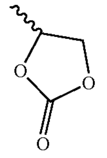

Those skilled in the art understand that the symbol used in formula (I) represents an attachment of the CH of the ring to the vinyl monomer.

More preferentially, the vinyl monomer has the $CH_2{=}C<$ subunit. The presence of this subunit in the vinyl monomer promotes the copolymerization of the vinyl monomer with the 1,3-diene in the synthesis of the elastomer of use for the purposes of the invention.

According to a particular embodiment, the vinyl monomer is a (meth)acrylate monomer of formula (II). The vinyl monomer may also be a mixture of (meth)acrylates of formula (II) which differ from one another by the $R_1$ or $R_2$ groups.

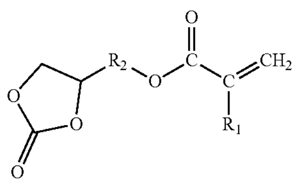

in which:

$R_1$ is a hydrogen or a methyl, $R_2$ is a hydrocarbon chain which may be interrupted or substituted by one or more heteroatoms.

Preferably, the (meth)acrylate monomer of formula (II) is selected from the group consisting of compounds of formula (III), (IV), (V) and mixtures thereof.

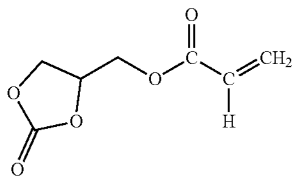

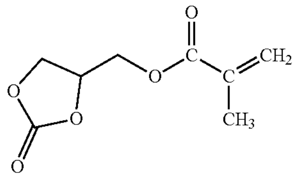

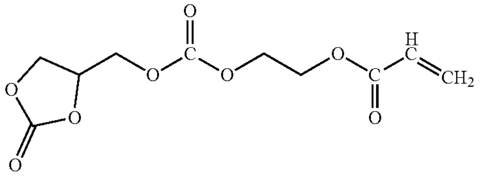

More preferentially, the (meth)acrylate monomer of formula (II) is the compound of formula (III), the compound of formula (IV), or the mixture thereof.

According to this other embodiment of the invention, the carbonate function may be provided along the elastomer chain by radical polymerization of a monomeric mixture comprising at least the 1,3-diene and the vinyl monomer that is at least substituted by a group containing a 1,3-dioxolan-2-one ring. This mode of synthesis is described in document FR3053974.

The content of carbonate functions is preferably between 0.1 and 20 mol per 100 mol of monomer units constituting the elastomer of use for the purposes of the invention. Below the value of 0.1, the bridging density of the elastomer chains after crosslinking is insufficient to impart satisfactory stiffness to the material as a function of the use thereof. Above the value of 20, the stiffening of the polymer composition may be deemed to be too great for certain rubber components of the tire which have to be sufficiently deformable, for example, to absorb shocks. For certain applications, the content of carbonate functions is more preferentially between 0.1 and 5 mol per 100 mol of monomer units constituting the elastomer of use for the purposes of the invention.

According to one embodiment of the invention, the elastomer of use for the purposes of the invention also contains units of a vinylaromatic monomer. As vinylaromatic monomer, the following are suitable for example: styrene and aromatic compounds comprising a double bond that is polymerizable by the radical route, such as, for example, compounds resulting from alkylation of the styrene, halogenation of the styrene, haloalkylation of the styrene and ether derivatives of the styrene. Preferably, the vinylaromatic monomer is styrene.

According to this particular embodiment of the invention, the vinylaromatic monomer units preferentially represent less than 45%, more preferentially less than 35% by weight of the elastomer of use for the purposes of the invention.

According to a preferential variant of the invention, the elastomer of use for the purposes of the invention is a copolymer of at least a 1,3-diene and a vinyl monomer that is at least substituted by a group containing a 1,3-dioxolan-2-one ring, the 1,3-diene and the vinyl monomer being defined according to any one of the embodiments of the invention.

According to another preferential variant of the invention, the elastomer of use for the purposes of the invention is a terpolymer of a 1,3-diene, a vinyl monomer that is at least substituted by a group containing a 1,3-dioxolan-2-one ring, and a vinylaromatic monomer, the 1,3-diene, the vinyl monomer and the vinylaromatic monomer being defined according to any one of the embodiments of the invention.

I.2. Crosslinking System

The diene elastomer described above bearing carbonate functions that are each present in a 1,3-dioxolan-2-one cycle that is described above is combined with a crosslinking system capable of crosslinking the elastomer chains of the composition of the tire according to the invention. This crosslinking system comprises a (that is to say at least one) polyamine compound as crosslinking agent.

The polyamine compound is a compound having at least two amine functions, preferably it has two amine functions. The amine functions are bonded to one another by aliphatic hydrocarbon groups or aromatic hydrocarbon groups or partially aliphatic and partially aromatic hydrocarbon groups, optionally interrupted by one or more heteroatoms. The hydrocarbon group may be a polymer, preferentially in that case an oligomer preferably having a number average mass Mn not exceeding 1500 g/mol, more preferentially not more than 1000 g/mol. The hydrocarbon group may be an oligomer optionally interrupted by one or more heteroatoms, such as oxygen. Mention may be made, among the polyamines according to the invention, of the polyamines in which the hydrocarbon group is a polyether, a polyalkylene, in particular a polymethylene, etc.

In the polyamine compound, the amine functions are preferably primary amines or secondary amines, more preferentially primary amines.

The polyamine compound of use for the purposes of the invention can be represented by the general formula (VI):

RRN-A-NRR in which:

A represents a hydrocarbon group comprising at least 1 carbon atoms, which is optionally substituted and optionally interrupted by one or more heteroatoms, the R symbols represent, independently of one another, a hydrogen atom or an alkyl group comprising at least 1 carbon atom.

Preferably, in the compound of general formula (I), A represents a divalent hydrocarbon group comprising at least 2 carbon atoms, more preferably at least 5.

Preferably, when A represents a divalent hydrocarbon group, A represents a divalent hydrocarbon group comprising at most 60 carbon atoms, preferably at most 30 carbon atoms.

Also preferentially, in the compound of general formula (I), A is a divalent hydrocarbon group of aliphatic type or a divalent hydrocarbon group of aromatic type or a divalent group comprising at least an aliphatic part and an aromatic part. Preferably, A is a divalent group of aliphatic type or a divalent group comprising at least an aliphatic part and an aromatic part.

According to one embodiment, in the compound of general formula (I), A may be interrupted by at least one heteroatom chosen from oxygen, nitrogen and sulfur, preferably oxygen.

According to one embodiment, in the compound of general formula (I), A may be substituted by at least one radical chosen from alkyl, cycloalkyl, aryl, aralkyl, hydroxyl, alkoxy and carbonyl radicals. These radicals are defined as: alkyl having from 1 to 20 carbon atoms, preferably from 1 to 12 carbon atoms, cycloalkyl having from 5 to 24 carbon atoms, aryl having from 6 to 30 carbon atoms and aralkyl having from 7 to 25 carbon atoms.

According to one embodiment, the compound of general formula (I) may comprise more than two amine functions; in this case, A is substituted by one or more amine functions of formula-NRR and/or by one or more hydrocarbon radicals chosen from alkyl, cycloalkyl, aryl or aralkyl radicals, themselves substituted by one or more amine functions of formula-NRR. These radicals are defined as: alkyl having from 1 to 20 carbon atoms, preferably from 1 to 12 carbon atoms, cycloalkyl having from 5 to 24 carbon atoms, aryl having from 6 to 30 carbon atoms and aralkyl having from 7 to 25 carbon atoms.

According to a preferential embodiment, A does not comprise any other amine function. The polyamine compound is in that case a diamine compound.

According to another preferential embodiment, in the compound of general formula (I), A is a divalent group of aliphatic type interrupted by at least one oxygen atom, more preferentially not comprising any other amine function.

The embodiments described above can be concomitant or alternative embodiments, in particular depending on their compatibility.

Preferably, in the compound of general formula (1), the R symbols represent, independently of one another, a hydrogen atom or an alkyl group having from 1 to 20 carbon atoms, preferably 1 to 12 carbon atoms, a cycloalkyl group having from 5 to 24 carbon atoms, an aryl group having from 6 to 30 carbon atoms or an aralkyl group having from 7 to 25 carbon atoms. More preferentially, the R symbols represent a hydrogen atom or an alkyl group having from 1 to 4 carbon atoms, more preferentially still each nitrogen atom, independently of the other, is substituted by a hydrogen atom and an alkyl group having from 1 to 4 carbon atoms or by two hydrogen atoms. More preferentially still, all the R symbols represent a hydrogen atom.

The preferential embodiments and aspects relating to the definitions of A and R can be combined with one another.

Polyamine compounds of use for the purposes of the invention are commercially available.

For example, as polyamine compounds that are commercially available and of use for the purposes of the invention, mention may be made of: ethylenediamine, Jeffamine® ED-600, a polyetheramine from the company HUNTSMAN, 1,3-cyclohexanediamine and para-xylenediamine, diamines from the company ABCR, etc.

The content of polyamine compound is preferentially at least 0.2 phr. Below 0.2 phr of polyamine compound, the effect of the crosslinking may not be sufficiently substantial. The content of polyamine compound is also preferentially at most 20 phr, preferably at most 10 phr. Above 20 phr of polyamine compound, the rubber-filler interaction may be detrimentally affected or else the excess polyamine, which has not reacted, may act as a plasticizer and reduce the stiffness of the composition. The content of polyamine compound is more preferentially within a range extending from 0.2 to 20 phr, preferably from 0.2 to 10 phr.

I.3 Reinforcing Filler

The rubber composition according to the invention comprises a reinforcing filler comprising silica. In addition, other reinforcing fillers can be used, such as carbon black or another reinforcing inorganic filler.

The physical state in which the silica is provided is not important, whether it be in the form of a powder, of micropearls, of granules, of beads or any other appropriate densified form.

The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 400 $m^2/g$, in particular from 60 to 300 $m^2/g$.

Any type of precipitated silica, in particular highly dispersible precipitated silicas (referred to as "HDS" for "highly dispersible" or "highly dispersible silica"), can be used. These precipitated silicas, which may or may not be highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G(-D), Hi-SII EZ160G(-D), Hi-Sil EZ200G(-D), Hi-Sil 243LD, Hi-Sil 210 and Hi-Sil HDP 320G silicas from PPG.

"Other reinforcing inorganic filler" should be understood here as meaning any inorganic or mineral filler, whatever its colour and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of tires. In a known way, some reinforcing inorganic fillers can be characterized in particular by the presence of hydroxyl (—OH) groups at their surface. Mineral fillers of the siliceous type (other than silica) or of the aluminous type, in particular alumina ($Al_2O_3$), are notably suitable as other reinforcing inorganic fillers.

All carbon blacks, notably the blacks conventionally used in tires or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, application WO97/36724-A2 or WO99/16600-A1).

Mention may be made, as examples of organic fillers other than carbon blacks, of functionalized polyvinyl organic fillers, as described in applications WO-A-2006/069792, WO-A-2006/069793, WO-A-2008/003434 and WO-A-2008/003435.

In the present disclosure, the BET specific surface area is determined by gas adsorption using the Brunauer-Emmett-Teller method described in "The Journal of the American Chemical Society", (Vol. 60, page 309, February 1938), and more specifically according to a method derived from Standard NF ISO 5794-1, appendix E, of June 2010 [multipoint (5 point) volumetric method-gas: nitrogen—degassing under vacuum: one hour at 160° C.—relative pressure p/po range: 0.05 to 0.2]. Moreover, the CTAB specific surface area values were determined according to Standard NF ISO 5794-1, appendix G of June 2010. The process is based on the adsorption of CTAB (N-hexadecyl-N,N,N-trimethylammonium bromide) on the "external" surface of the reinforcing filler.

Preferentially, the content of total reinforcing filler is at least 30 phr, preferably at least 40 phr, and at most 180 phr. Below 30 phr, the reinforcement of the rubber composition may prove insufficient to contribute an appropriate level of cohesion of the rubber component of the tire comprising this composition. More preferentially still, the content of total reinforcing filler is at least 50 phr. Preferentially, the content of total reinforcing filler is at most 180 phr, preferably at most 160 phr. Above 180 phr, there is a risk of increase in the hysteresis and thus in the rolling resistance of the tires. For this reason, the content of total reinforcing filler is preferably within a range extending from 30 to 180 phr, more preferentially from 40 to 180 phr and more preferentially still within a range extending from 50 to 160 phr. Any one of these ranges of content of total reinforcing filler can apply to any one of the embodiments of the invention.

Preferably, use is made of silica at a content ranging from 30 to 180 phr, more preferentially from 40 to 180 phr, and optionally of carbon black. When it is present, the carbon black is preferably used at a content of less than 50 phr, more preferentially within a range extending from 0.1 to 50 phr, more preferentially from 0.1 to 30 phr, notably from 0.1 to 10 phr, or even from 0.1 to 5 phr.

According to one particular embodiment of the invention, the silica represents more than 50% by weight of the total weight of the reinforcing filler of the rubber composition. It is then said that the silica is predominant or is the predominant reinforcing filler.

When it is combined with silica as predominant reinforcing filler, the carbon black is preferably used at a content of less than 20 phr, more preferentially of less than 10 phr (for example from 0.1 to 10 phr, notably from 0.1 to 5 phr or from 0.5 to 20 phr, notably from 2 to 10 phr). Within the intervals indicated, the colouring properties (black pigmenting agent) and UV-stabilizing properties of the carbon blacks are beneficial, without, moreover, adversely affecting the typical performance qualities contributed by the silica.

A person skilled in the art will understand that, as replacement for the silica described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. Mention may be made, by way of example, of carbon blacks partially or completely covered with silica, or of carbon blacks modified by silica, such as, without limitation, the fillers of Ecoblack® type of the CRX2000 series or of the CRX4000 series from Cabot Corporation.

In order to couple the reinforcing inorganic filler to the elastomer, use may be made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

When a coupling agent is used, the content thereof is advantageously less than 20 phr, it being understood that it is generally desirable to use as little as possible thereof. Typically, the content of covering agent represents from 0.5% to 15% by weight relative to the amount of inorganic filler. Its content is preferentially between 0 and 12 phr. This content is easily adjusted by those skilled in the art according to the content of inorganic filler used in the composition.

Those skilled in the art know to use, in rubber compositions, at least one agent for covering the reinforcing inorganic filler. Such agents are capable, in a known manner, by virtue of an improvement in the dispersion of the filler in the rubber matrix and of a lowering of the viscosity of the compositions, of improving their ability to be processed in the uncured state. Mention may be made, as agent for covering the silica, of hydroxylated or hydrolysable silanes, non-aromatic polyols, polyethers, amines, hydroxylated or hydrolysable polysiloxanes, guanidine derivatives, alkali metal or alkaline earth metal hydroxides, and the mixtures of such compounds; among such compounds, mention may also be made of diphenylguanidine or octadecylamine.

According to a preferential variant of the invention, the rubber composition does not comprise such a covering agent. Thus, according to this variant, the rubber composition according to the invention is free of such a covering agent or contains less than 1 phr of such a covering agent, preferably less than 0.5 phr and more preferentially less than 0.2 phr. Very particularly, the rubber composition according to the invention is free of, or contains less than 1 phr of, an agent chosen from hydroxylated or hydrolysable silanes, non-aromatic polyols, polyethers, amines, hydroxylated or hydrolysable polysiloxanes, guanidine derivatives, alkali metal or alkaline earth metal hydroxides, and the mixtures of such compounds; among such compounds, mention may also be made of diphenylguanidine or octadecylamine. More particularly still, the rubber composition according to the invention is free of, or contains less than 1 phr of, diphenylguanidine.

This preferential variant makes it possible to optimize even more significantly the tensile properties of the composition according to the invention.

I.4 Terpene Phenolic Resin

According to the invention, a terpene phenolic resin predominantly composed of units derived from terpene monomers and phenolic monomers is combined with the diene elastomer bearing carbonate functions that are each present in a 1,3-dioxolan-2-one ring, the crosslinking system and the reinforcing filler that are described above.

A "terpene", a polymer of isoprene ($C_5H_8$), is understood to mean monoterpene ($C_{10}H_{16}$), sesquiterpene ($C_{15}H_{24}$), diterpene ($C_{20}H_{32}$) and others of the same nature, and mixtures thereof. More particularly, the term "terpene" encompasses here, in a known manner, the monomers alpha-pinene, beta-pinene, dipentene, limonene, myrcene, allo-ocimene, ocimene, alpha-phellandrene, alpha-terpinene, gamma-terpinene, terpinolene, 1,8-cineole, 1,4-cineole, alpha-terpineol, beta-terpineol, gamma-terpineol, camphene, tricyclene, sabinene, para-menthadienes, carenes and others of the same nature, and mixtures thereof.

A phenolic monomer is understood to mean, in a known manner, phenol or any monomer derived from phenol which can be polymerized with a terpene. By way of example, mention may be made of phenol, bisphenol A, cresol, xylenol and others of the same nature, and mixtures thereof.

Preferably, the phenolic monomer is phenol.

The terpene phenolic resin predominantly composed of units derived from terpene and phenolic monomers, may comprise, in addition to these units, and in a minor amount, aliphatic units, or aromatic units or else units of aliphatic/aromatic type, that is to say based on aliphatic and/or aromatic monomers, other than terpenes and phenols. This type of resin is described in document WO 2010/144890.

The content of terpene phenolic resin in the composition according to the invention is preferably at least 0.5 phr, preferably at least 5 phr. The content of terpene phenolic resin in the composition according to the invention is preferably at most 50 phr, more preferentially at most 20 phr. More preferably, the content of terpene phenolic resin in the composition according to the invention is within a range extending from 5 phr to 20 phr. Indeed, below 0.5 phr of this resin of use for the purposes of the invention, the effect of this resin might be insufficient and the tensile properties of the composition might be unsatisfactory, whilst above 50 phr, the composition might present manufacturing difficulties in terms of readily incorporating all the resin into the composition.

The rubber composition may also contain one or more diene elastomers other than the elastomer of use for the purposes of the invention. Another diene elastomer is then very preferentially an epoxidized diene elastomer.

According to any one of the embodiments of the invention, the rubber composition preferentially comprises more than 50 phr, more preferentially 75 phr of the diene elastomer of use for the purposes of the invention, comprising units of a 1,3-diene monomer and bearing carbonate functions that are each present in a 1,3-dioxolan-2-one ring. The balance to 100 phr then very preferentially consists of one or more diene elastomers.

According to any one of the embodiments of the invention, the rubber composition preferentially comprises 100 phr of the diene elastomer of use for the purposes of the invention, comprising units of a 1,3-diene monomer and bearing carbonate functions that are each present in a 1,3-dioxolan-2-one ring.

A diene elastomer of use for the purposes of the invention is understood to mean one or more diene elastomers comprising units of a 1,3-diene monomer and bearing carbonate functions that are each present in a 1,3-dioxolan-2-one ring. The use of the expression "diene elastomer comprising units of a 1,3-diene monomer and bearing carbonate functions that are each present in a 1,3-dioxolan-2-one ring" in the singular is understood as the sum of the diene elastomers, comprising units of a 1,3-diene monomer and bearing carbonate functions that are each present in a 1,3-dioxolan-2-one ring, present in the composition according to the invention.

I.5 Other Additives

The rubber composition in accordance with the invention may also comprise all or some of the usual additives customarily used in elastomer compositions intended to constitute mixtures of finished rubber articles such as tires, such as, for example, plasticizers or extender oils other than those described above, pigments, protective agents such as anti-ozone waxes, chemical anti-ozonants or antioxidants.

Preferentially, the rubber compositions of the invention are free of a crosslinking system other than the one described above and which comprises a polyamine compound. In other words, the crosslinking system based on at least one polyamine compound is preferentially the only crosslinking system in the rubber composition of the invention. Preferably, the compositions of the invention are free of a vulcanization system, or contain less than 1 phr of sulfur, preferably less than 0.5 phr and more preferentially less than 0.2 phr. The composition is preferentially free of any vulcanization accelerator as known to those skilled in the art, or contains less than 1 phr, preferably less than 0.5 phr and more preferentially less than 0.2 phr thereof.

I.6 Preparation of the Rubber Compositions

The rubber composition in accordance with the invention is manufactured in appropriate mixers, using two successive phases of preparation well known to a person skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically below 110° C., for example between 40° C. and 100° C., during which finishing phase the crosslinking system is incorporated.

The elastomer of use for the purposes of the invention is generally introduced during the "non-productive" phase in order to be thermomechanically kneaded with the reinforcing filler and the terpene phenolic resin, and optionally the other ingredients, with the exception of the crosslinking system.

The rubber composition may be prepared by a process which comprises the following steps:

- incorporating, in the elastomer, during a first "non-productive" step, the terpene phenolic resin, the reinforcing filler and, if appropriate, a coupling agent or a covering agent, by kneading thermomechanically until a maximum temperature of between 130° C. and 180° C. is reached,
- cooling the combined mixture to a temperature of less than 100° C.,
- subsequently incorporating a crosslinking system,
- kneading the whole up to a maximum temperature below 120° C.

The final composition thus obtained is subsequently calendered, for example in the form of a sheet or slab, notably for laboratory characterization, or else extruded, in order to form, for example, a rubber profiled element used as rubber component for building the tire.

The rubber composition in accordance with the invention can be either in the uncured state (before crosslinking) or in the cured state (after crosslinking). It is preferentially used in a tire.

The abovementioned characteristics of the present invention, and also others, will be better understood on reading the following description of several exemplary embodiments of the invention, given by way of illustration and without limitation.

II. Examples

II.1—Measurements and Tests Used:

II.1.a—Size Exclusion Chromatography (SEC):

Size exclusion chromatography makes it possible to separate macromolecules in solution according to their size through columns filled with a porous gel. The macromolecules are separated according to their hydrodynamic volume, the bulkiest being eluted first. Without being an absolute method, SEC makes it possible to comprehend the molar mass distribution of a polymer. The various number-average molar masses (Mn) and weight-average molar masses (Mw) may be determined from commercial standards and the polymolecularity or polydispersity index (PI=Mw/Mn) may be calculated via a "Moore" calibration. There is no specific treatment of the polymer sample before analysis. The latter is simply dissolved, in a tetrahydrofuran solution containing 1% by volume of diisopropylamine, 1% by volume of triethylamine and 1% by volume of distilled water, at a concentration of approximately 1 g/l. Next, the solution is filtered through a filter with a porosity of 0.45 μm before injection. The apparatus used is a Waters Alliance chromatograph. The elution solvent is tetrahydrofuran containing 1 vol % of diisopropylamine and 1 vol % of triethylamine. The flow rate is 0.7 ml/min, the temperature of the system is 35° C. and the analysis time is 90 min. A set of four Waters columns in series, having the commercial names Styragel HMW7, Styragel HMW6E and two Styragel HT6E, is used. The volume of the solution of the polymer sample injected is 100 μl. The detector is a Waters 2410 differential refractometer and the software for processing the chromatographic data is the Waters Empower system. The calculated average molar masses are relative to a calibration curve produced from PSS Ready Cal-Kit commercial polystyrene standards.

II.1.b—Nuclear Magnetic Resonance (NMR) Spectroscopy

The contents of carbonate functions on the polymer chain are determined by NMR analysis. The spectra are acquired on a Bruker 500 MHz spectrometer equipped with a 5 mm BBI z-grad "broadband" probe. The quantitative 1H NMR experiment uses a 30° single pulse sequence and a repetition time of 3 seconds between each acquisition. The samples are dissolved in deuterated chloroform.

The $^1H$ NMR spectrum makes it possible to quantify the content of carbonate functions incorporated within the chain by integration of the signals characteristic of the protons of the subunits. The abbreviation MCA denotes the monomer unit of formula (IV-u), and PB1,2 and PB1,4 denote the monomer units of the 1,3-butadiene inserted in the chain by 1,2- and 1,4- addition, respectively.

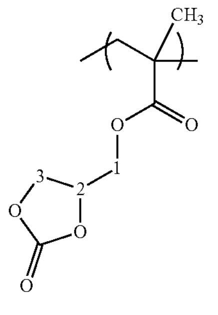

4H corresponding to $CH_2$ no. 1 MCA+$CH_2$ no. 3 MCA: from 3.3 to 4.5 ppm

2H+1H corresponding to PB1,2+CH no. 2 MCA: from 4.5 to 4.9 ppm

2H+1H corresponding to PB1,4+PB1,2: from 4.9 to 5.8 ppm 5H styrene subunit: 7.41 ppm to 6.5 ppm.

II.1.c—Tensile Tests:

These tests make it possible to determine the elasticity stresses and the properties at break after curing. Unless otherwise indicated, they are carried out in accordance with French standard NF T 46-002 of September 1988. Processing the tensile recordings also makes it possible to plot the curve of modulus as a function of the elongation. The modulus used here is the nominal (or apparent) secant modulus measured in first elongation, calculated by normalizing to the initial cross section of the test specimen. The nominal secant moduli (or apparent stresses, in MPa) are measured in first elongation at 50%, 100% and 300% elongation, respectively denoted MSA50, MSA100 and MSA300. All these tensile measurements are carried out under the standard conditions of temperature and hygrometry (at 23° C.±2° C. and at 100° C.±2° C.; 50%±5% relative humidity).

The tensile strengths (in MPa) and the elongations at break (in %) are measured at 23° C.±2° C. and at 100° C.±2° C., according to standard NF T 46-002 of 1988.

II.2—Synthesis of the Polymer and Preparation of the Compositions:

II.2.a—Reagents

Throughout the examples given below, sodium dodecyl sulfate, iron sulfate, cumene hydroperoxide, sodium pyrophosphate, potassium persulfate, tert-dodecylmercaptan, N,N-diethylhydroxylamine, resorcinol, disodium hydrogen phosphate and ammonium dihydrogen phosphate are sold by Aldrich.

The 4-(hydroxymethyl)-1,3-dioxolan-2-one methacrylate is from Specific Polymers.

The styrene and the butadiene are purified by passage over alumina guard and by sparging with nitrogen.

II.2.b—Synthesis of the Terpolymer of Styrene, Butadiene and 4-(Hydroxymethyl)-1,3-Dioxolan-2-One Methacrylate (CCMA) by Cold Polymerization Prior preparation of the following:

Suspension in water of $Na_2FeP_2O_7$ at 0.0627 mol/l: $FeSO_4 \cdot 7H_2O$ and $Na_4P_2O_7$ are diluted in sparged water, then the mixture is heated at 60° C. for 45 minutes with regular stirring, Preparation of a solution of cumene hydroperoxide in styrene at 0.079 mol/l, Preparation of a solution of mercaptan (R—SH) in styrene at 0.223 mol/l, Preparation of a solution of N,N-diethylhydroxylamine in water at 10 g/l.

The reactor is loaded according to the following operations:

introduce the sparged water over half an hour at 25° C. (final volume 22.3 ml)

then sodium dodecyl sulfate (SDS) under nitrogen at 25° C. followed by 10 min nitrogen flushing (0.3 g)

inject the styrene feedstock containing the R—SH at 25° C. under nitrogen (1 ml of solution at 0.223 mol/l)

cool the reactor to reach 5° C.

when the reactor reaches approximately 12° C., inject the rest of the styrene (1.815 ml, 1.65 g) and the CCMA (0.39 ml, 0.56 g), under nitrogen then inject the butadiene feedstock (9.88 ml, 6.42 g)

leave the reactor to cool down to 5° C., then inject the solution of $Na_2FeP_2O_7$ (1.7 ml of solution at 0.0627 mol/l)

wait 5 minutes, then inject the initiator and the solution of cumene hydroperoxide in styrene (0.5 ml).

The end of the addition of the initiator marks the start of the polymerization (i.e. t=0 min). Stirring is maintained at 5° C. for 7 h 15 min to reach approximately 63% of final conversion. Finally, a stopping solution of N,N-diethylhydroxylamine in water is prepared. The latex is then stopped by decanting by residual pressure of the monomers on this stopping solution. The latex is subsequently coagulated by addition of 50 ml of acetone. The coagulum is dried under partial vacuum and under nitrogen flushing for 48 h at 40° C.

The operating conditions are listed in the following Table 1.

TABLE 1

| | | | | |
|---|---|---|---|---|
| Water | | | 22.3 | ml |
| SDS | 3 | phr | 0.3 | g |
| R-SH | 0.16 | phr | 0.016 | g |
| $FeSO_4 \cdot 7H_2O$ | 0.28 | phr | 0.028 | g |
| $Na_4P_2O_7$ | 0.266 | phr | 0.026 | g |
| wt % styrene (mol %) | 30.14% | (19%) | 3.014 | g |
| wt % butadiene (mol %) | 64.23% | (79%) | 6.42 | g |
| wt % CCMA (mol %) | 5.63% | (2%) | 0.56 | g |
| Cumene hydroperoxide | 0.17 | phr | 0.017 | g |
| N,N-diethylhydroxylamine | 0.1 | phr | 0.01 | g |

The polymer obtained was characterized by NMR and SEC analyses. The results of the characterizations appear in Table 2.

TABLE 2

| | SEC characterization | NMR characterization | | |
|---|---|---|---|---|
| Polymer | $M_n$ (kg/mol) | carbonate mol % | Styrene mol % | Butadiene mol % |
| | 83 | 2.6 | 16.2 | 81.2 |

II.2.c—Preparation and Characterization of the Rubber Compositions:

In order to prepare the compositions E1 to E3 according to the invention and $C_1$ to $C_3$ as counterexamples, the following tests are carried out in the following manner.

The silica was introduced at the same volume fraction into each mixture so that the comparisons are indeed analytical, the content of covering agent and of coupling agent was adapted accordingly, The mixing procedure followed for the control composition C1 is the following:

In a Haake-type internal mixer, the matrix is mixed for 1 min. Two thirds of the silica, the DPG and the silane are then added. After mixing for 1 min, the remainder of the silica, the 6PPD, the paraffin, the stearic acid and the resin are introduced. After 1 min, the zinc oxide is incorporated into the mixture. Everything is then mixed for 1 min. A ram stroke is then performed and the mixture is dropped to a temperature of around 145° C. after mixing for 4 min 30 sec.

The material thus obtained is cooled on an open mill, the sulfur and the CBS are incorporated, then 12 turnover passes are carried out in order to homogenize the mixture.

The mixing procedure followed for the other compositions E1, E2, E3 and C2, C3 is the following:

In a Haake-type internal mixer, the matrix is mixed for 1 min. Two thirds of the silica and the silane are then added. After mixing for 1 min, the remainder of the silica and also the DPG and the terpene phenolic resin (if present) are introduced. After 1 min, the polyamine is incorporated into the mixture. Everything is then mixed for 1 min. A ram stroke is then performed and the mixture is dropped to a temperature of around 145° C. after mixing for 4 min 30 sec.

The compositions thus obtained are subsequently calendered, either in the form of slabs (thickness of 2 to 3 mm) or of thin sheets of rubber for the measurement of their physical or mechanical properties. The calendered compositions are then cured under a press for 30 min at 150"° C., then characterized. The materials are then evaluated in terms of rubber properties.

The rubber compositions are given in the following Table 3. The amounts are expressed in parts per 100 parts by weight of elastomer.

TABLE 3

| components | C1 Counterexample 1 Vulcanization control composition | C2 Counterexample 2 Composition without DPG and without terpene phenolic resin | C3 Counterexample 3 Composition with DPG and without terpene phenolic resin | E1 Example 1 Composition without DPG and with terpene phenolic resin | E2 Example 2 Composition without DPG and with terpene phenolic resin | E3 Example 3 Composition with DPG and with terpene phenolic resin |
|---|---|---|---|---|---|---|
| SBR-carbonate (1) | 100 | 100 | 100 | 100 | 100 | 100 |
| Silica (2) | 73 | 50 | 51 | 54 | 53 | 56 |
| Silane (3) | 5.86 | 4 | 4.1 | 4.4 | 4.24 | 4.5 |
| Resin (4) | 31 | | | | | |
| 6 PPD (5) | 3 | | | | | |
| Paraffin | 1 | | | | | |
| DPG (6) | 2.5 | | 6 | | | 6 |
| Zinc oxide (7) | 10.9 | | | | | |
| Stearic acid (8) | 3 | | | | | |

TABLE 3-continued

| components | C1 Counterexample 1 Vulcanization control composition | C2 Counterexample 2 Composition without DPG and without terpene phenolic resin | C3 Counterexample 3 Composition with DPG and without terpene phenolic resin | E1 Example 1 Composition without DPG and with terpene phenolic resin | E2 Example 2 Composition without DPG and with terpene phenolic resin | E3 Example 3 Composition with DPG and with terpene phenolic resin |
|---|---|---|---|---|---|---|
| Polyamine (9) | | 6.56 | 6.56 | 6.56 | 6.56 | 6.56 |
| Terpene phenolic resin (10) | | | | 10.4 | 7.8 | 10.4 |
| Soluble sulfur | 1 | | | | | |
| CBS (11) | 2.3 | | | | | |

1. carbonate-functionalized SBR synthesized above
2. Zeosil 1165MP silica (Rhodia)
3. Si69 liquid silane (Degussa)
4. hydrogenated C9 dicyclopentadiene resin E5600 BR (Exxon Mobil)
5. Santoflex 6PPD (Solutia)
6. diphenylguanidine
7. zinc oxide (Umicore)
8. Pristerene 4031 (Uniqema)
9. Jeffamine ED-600 diamine crosslinking agent (Sigma-Aldrich)
10. SYLVARES TP2040 terpene phenolic resin (Kraton)
11. Santocture CBS (Flexys)

Compositions E1 and E2 differ from composition C1 in that composition C1 contains, as crosslinking system, a conventional sulfur vulcanization system comprising accelerators (DPG and CBS), activators (ZnO and stearic acid), and optionally vulcanization retarders, whereas compositions E1 and E2 contain a crosslinking system according to the invention based on a polyamine.

It is recalled that the silica was introduced at the same volume fraction into each mixture so that the comparisons are indeed analytical. Composition C1 is formulated to offset the higher weight content of silica with the plasticizer (paraffin and resin) contents.

Compositions E1 and E2 differ from composition C2 in that composition C2 contains a crosslinking system comprising a polyamine compound but does not contain a terpene phenolic resin.

The results are given in base 100 relative to the control and appear in Tables 4 and 5.

TABLE 4

| | C1 Counter-example 1 Control composition with vulcani-zation system | C2 Counter-example 2 Control composition without terpene phenolic resin | E1 Example 1 Com-position with terpene phenolic resin content of 10.4 phr | E2 Example 2 Com-position with terpene phenolic resin content of 7.8 phr |
|---|---|---|---|---|
| Av. strain at break (%) at 23° C. | 130 | 100 | 130 | 169 |
| Tensile strength (MPa) at 23° C. | 131 | 100 | 131 | 92 |
| MSA100 (MPa) at 23° C. | 3.4 | 3.6 | 3.7 | 2.47 |
| MSA300 (MPa) at 23° C. | 4.6 | 5.2 | 4.9 | 2.59 |
| MSA300/MSA100 at 23°C. | 1.35 | 1.44 | 1.35 | 1.05 |
| Strain at break (%) at 100° C. | 121 | 100 | 111 | 122 |

TABLE 4-continued

| | C1 Counter-example 1 Control composition with vulcani-zation system | C2 Counter-example 2 Control composition without terpene phenolic resin | E1 Example 1 Com-position with terpene phenolic resin content of 10.4 phr | E2 Example 2 Com-position with terpene phenolic resin content of 7.8 phr |
|---|---|---|---|---|
| Tensile strength (MPa) at 100° C. | 107 | 100 | 115 | 67 |

It is noted in the compositions of the invention that the replacement of the conventional vulcanization system by a crosslinking system based on a polyamine compound in the presence of terpene phenolic resin makes it possible to maintain the tensile properties with a good level of stiffness and reinforcement, and, in certain cases, makes it possible to obtain an increase in strain at break.

Also noted is the surprising and unexpected nature of the improvement observed in the tensile properties in view of the addition of a terpene phenolic resin to the composition containing a crosslinking system based on a polyamine compound.

Thus, the use of a crosslinking system based on a polyamine compound in a composition containing a diene elastomer bearing carbonate functions that are each present in 1,3-dioxolan-2-one rings, makes it possible, in the presence of terpene phenolic resin, to simplify the crosslinking system and gives the composition good tensile properties while maintaining a good level of reinforcement and stiffness.

TABLE 5

| | C3 Counter-example 3 Composition with DPG and without resin | E3 Example 3 Composition with DPG and with terpene phenolic resin | E1 Example 1 Composition without DPG and with terpene phenolic resin |
|---|---|---|---|
| Av. strain at break (%) at 23° C. | 100 | 106 | 221 |
| Tensile strength (MPa) at 23° C. | 100 | 123 | 268 |
| Strain at break (%) at 100° C. | 100 | 114 | 204 |
| Tensile strength (MPa) at 100° C. | 100 | 106 | 200 |

By comparing compositions E1 and E3 to the control composition C3, the improvement in the tensile properties on adding a terpene phenolic resin to the composition containing a crosslinking system based on a polyamine compound and also a conventional diphenylguanidine type covering agent is observed.

Also noted is the surprising and unexpected nature of the significant improvement observed in the tensile properties in view of the removal of a conventional covering agent, in this case diphenylguanidine, in the presence of a terpene phenolic resin, from the composition containing a crosslinking system based on a polyamine compound.

Thus, the use of a crosslinking system based on a polyamine compound in a composition containing a diene elastomer bearing carbonate functions that are each present in 1,3-dioxolan-2-one rings, and free of an agent for covering the silica, makes it possible, in the presence of a terpene phenolic resin, to simplify the crosslinking system and gives the composition significantly improved tensile properties compared to a composition according to the invention which contains an agent for covering the silica.

The invention claimed is:

1. A rubber composition containing at least:

a reinforcing filler comprising silica;

an elastomer comprising units of a 1,3-diene monomer and bearing carbonate functions that are each present in a 1,3-dioxolan-2-one ring;

a crosslinking system comprising a polyamine compound; and a terpene phenolic resin.

2. The rubber composition according to claim 1, wherein the carbonate functions are pendent, located outside ends of an elastomer chain.

3. The rubber composition according to claim 1, wherein a content of carbonate functions is between 0.1 and 20 mol per 100 mol of monomer units constituting the elastomer.

4. The rubber composition according to claim 1, wherein the 1,3-diene monomer is 1,3-butadiene, isoprene or the mixture thereof.

5. The rubber composition according to claim 1, wherein the rubber composition is free of an agent for covering the silica.

6. The rubber composition according to claim 1, wherein the polyamine compound comprises at least two amine functions, and two amine functions of the polyamine compound are bonded together by an aliphatic or aromatic hydrocarbon group or a partially aliphatic and aromatic hydrocarbon group, optionally interrupted by one or more heteroatoms, the amine functions of which are primary or secondary amine functions.

7. The rubber composition according to claim 6, wherein the hydrocarbon group bonding two amine functions of the polyamine compound is an oligomer having a number-average molecular mass Mn of at most 1500 g/mol.

8. The rubber composition according to claim 6, wherein the polyamine compound comprises two amine functions.

9. The rubber composition according to claim 1, wherein the polyamine compound is present at a content ranging from 0.2 to 20 phr.

10. The rubber composition according to claim 1, wherein the polyamine compound corresponds to the general formula VI:

RRN-A-NRR in which:

A represents a hydrocarbon group comprising at least 1 carbon atom, which is optionally substituted and optionally interrupted by one or more heteroatoms, and each R represents, independently of one another, a hydrogen atom or an alkyl group comprising at least 1 carbon atom.

11. The rubber composition according to claim 1, wherein the reinforcing filler comprises more than 50% by weight of silica.

12. The rubber composition according to claim 1, wherein the terpene phenolic resin is a resin composed predominantly of units derived from terpene and phenol monomers.

13. The rubber composition according to claim 1, wherein the terpene phenolic resin is present at a content of at least 0.5 phr and of at most 50 phr.

14. A tire comprising the rubber composition according to claim 1.

* * * * *